J. J. LEIDIGH.
VALIDATING STAMPING SYSTEM.
APPLICATION FILED JULY 17, 1913.
1,152,522.
Patented Sept. 7, 1915.
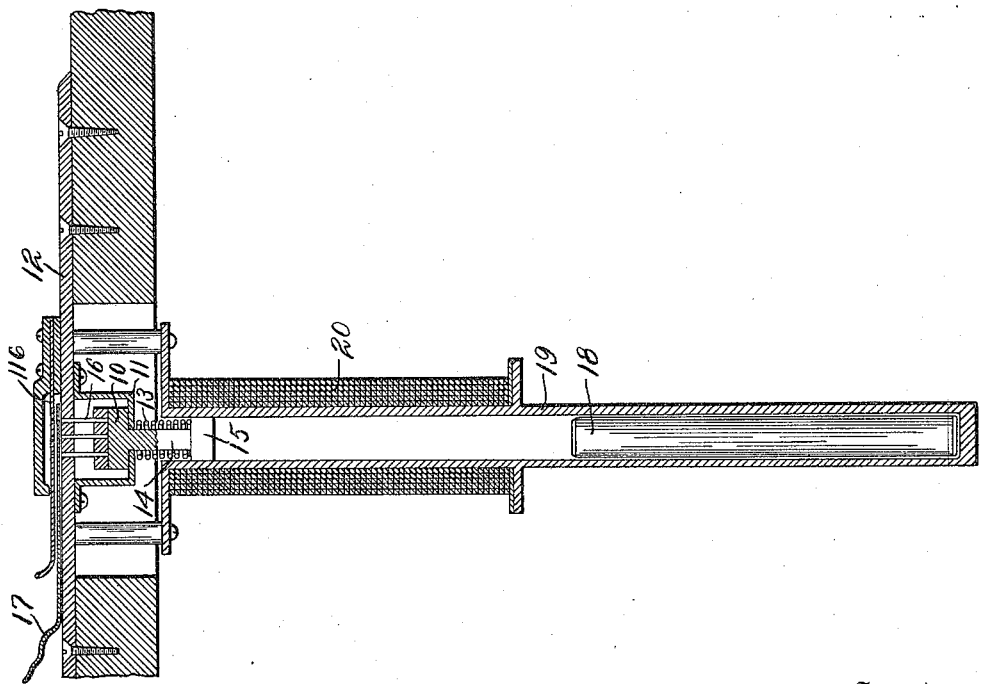
Witnesses
H. F. Sadgebury
J. B. Ricketts
Inventor
John J. Leidigh
by R. C. Islass
Chester H Braselton
Attorneys

UNITED STATES PATENT OFFICE.

JOHN J. LEIDIGH, OF MILWAUKEE, WISCONSIN, ASSIGNOR TO THE NATIONAL CASH REGISTER COMPANY, OF DAYTON, OHIO, A CORPORATION OF OHIO, (INCORPORATED IN 1906.)

VALIDATING STAMPING SYSTEM.

1,152,522.      Specification of Letters Patent.      Patented Sept. 7, 1915.

Original application filed July 2, 1906, Serial No. 324,363. Renewed April 13, 1911, Serial No. 620,888. Divided and this application filed July 17, 1913. Serial No. 779,436.

*To all whom it may concern:*

Be it known that I, JOHN J. LEIDIGH, a citizen of the United States, residing at Milwaukee, in the county of Milwaukee and State of Wisconsin, have invented certain new and useful Improvements in Validating Stamping Systems, of which I declare the following to be a full, clear, and exact description.

This invention relates to marking devices, and has more particular relation to that form of marking device which is employed as a validating means in connection with store service systems.

In many large retail stores it is customary in the handling of all charge transactions to submit a written memorandum of sale to a credit man to receive his O. K. before goods are allowed to pass from the counter where the sale is made. In order to facilitate the O. K.'ing of memorandum sales slips on charge transactions, there have been employed various forms of systems whereby a credit man may be located permanently at a credit station. In order to enable the credit man to remain at the central credit station and facilitate the matter of O. K.'ing charge sales therefrom, there have been provided various forms of telephone systems whereby telephonic communication may be established between a clerk and the credit man to inform the latter of the details of the sale. If the credit man decides to authorize the credit sale it is customary to provide a marking device at the clerk's station and under the control of means at the credit man's station whereby said marking device might be rendered effective so to mark the memorandum sales slip as to indicate that the credit man authorized the particular credit sale involved. Various forms of validating means have been provided and it is the purpose of the present invention to provide an improved form of validating means whereby the mark effected by the validating means is in the form of punch marks. In a prior renewal application, Serial No. 620,888, filed April 13, 1911, the original application for which was filed July 2nd, 1906, for a "Credit marking apparatus," a validating means of the same type has been shown and the present application is a division thereof. In the prior application the general system including the present form of validating means is claimed and the claims in this case will be limited to the particular form of validating device shown.

With these and incidental objects in view, the invention consists in certain novel features of construction and combinations of parts, the essential elements of which are set forth in appended claims, and a preferred form of embodiment of which is hereinafter described with reference to the drawing which accompanies and forms part of the specification.

The figure is a sectional view of the validating device.

The particular form of validating device shown in the figure is in the form of a punching device which is adapted to punch on an inserted memorandum sales slip, the O. K. of the credit man, thereby indicating that the credit man has authorized the particular sale involved. The punch shown in the figure comprises a punching head 10 mounted in a frame 11 fast to a top plate 12 and normally held in lower position by a spring 13 surrounding a downwardly extending portion 14 of the printing head and interposed between the frame 11 and a collar 15 carried by the lower end of the portion 14. The printing head carries a series of punch pins 16 which project through holes formed in the top plate 12 and are adapted to coöperate with a die plate 116 mounted on the upper side of the top plate 12. The die plate 116 is mounted in such a manner as to provide a space intermediate the die plate 116 and top plate 12 whereby a sales slip 17 may be inserted therebetween to receive the validating punch mark.

The punching head 10 is adapted to be forced upward to punch the inserted sales slip by a movable core 18 normally resting at the bottom of a perpendicular cylindrical tube 19 in alinement with the punching head, which tube is surrounded by a solenoid coil 20. When the solenoid coil is energized in a manner hereinafter described, the movable core 18 is adapted to be drawn upward to strike the downwardly projecting portion of the printing head 10 a sharp blow thereby forcing the punch pins 16 through the inserted sales slip and the die plate 116. As the solenoid coil 20 is adapted to be energized only momentarily, the movable core 18 will drop down immediately following the deënergization of the coil thereby permitting the withdrawal of the punch head under the action of the spring 13. The withdrawal of the punch head, it will clearly be seen, will cause the punch pins 16 to be withdrawn from the punch marks formed in the sales slip 17 and thereby permit the withdrawal of said slip.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In an apparatus of the described class, the combination with a perforated table; a die supporting bracket mounted on said table; a die supported by said bracket above the table, and having perforations corresponding with the perforations in said table; a punching head having pins in alinement with said perforations; an electromagnetic coil depending from said table; and a magnetizable bar adapted to be actuated by said coil into contact with the punching head.

2. In a device of the character described, a magnetic check-punching device comprising a solenoid, a core therefor, a spring retracted punch member in the path of the core and adapted to be struck and moved thereby, punch-pins carried by the punch member, a plate having perforations in which the punch-pins project, and a die adapted to receive a check and having perforations into which the punch-pins may be driven through the check when the punch member is struck by the solenoid-core.

3. In a device of the character described, a magnetic check-punching device comprising a solenoid, a core therefor, a punch member in the path of the core and adapted to be struck and moved thereby, punch-pins carried by the punch member, a plate having perforations in which the punch-pins project, said punch member having a shouldered reduced portion, a punch rest connected to the plate and having an opening through which the reduced portion of the punch member passes, a coil spring surrounding the reduced portion of the punch member and bearing against its shoulder and against the punch-rest, and a check receiving die mounted on the plate and having perforations into which the punch-pins are adapted to be driven through the check when the punch member is struck by the solenoid-core.

4. In a device of the character described, a check-punching means comprising a solenoid, a core-tube for the solenoid extending beneath the same, a core operating in the core-tube, a plate to which the core-tube is rigidly secured, a punch member having a reduced portion projecting into the core-tube and adapted to be struck and moved by the core, a series of punch-pins carried by the punch member, a top-plate connected with the before-mentioned plate at a distance therefrom and having perforations into which the punch pins extend, a punch-rest mounted on the top of the plate for supporting the punch member and having an opening through which the reduced portion of the punch member extends, a coil-spring surrounding and engaging the reduced portion of the punch member and bearing on the punch-rest, a check-receiving die-strip on the top plate having perforations into which the punch-pins are adapted to be driven when the punch member is struck by the solenoid-core, and a bracing-strip on the die-strip adapted to prevent it being bent out of position.

In testimony whereof I affix my signature in the presence of two witnesses.

JOHN J. LEIDIGH.

Witnesses:
  A. W. LEIDIGH,
  KATHERINE HOLT.

Copies of this patent may be obtained for five cents each, by addressing the "Commissioner of Patents, Washington, D. C."